United States Patent [19]

Bayless

[11] Patent Number: 5,424,001
[45] Date of Patent: Jun. 13, 1995

[54] GRAPHIC INK REMOVER COMPOSITION CONTAINING DIBASIC ESTER AND METHOD OF REMOVING INK

[75] Inventor: Ronnie E. Bayless, Plant City, Fla.

[73] Assignee: Dotolo Research Corporation, Largo, Fla.

[21] Appl. No.: 86,685

[22] Filed: Jul. 1, 1993

[51] Int. Cl.⁶ .............................................. C11D 3/18
[52] U.S. Cl. .................................. 252/170; 252/162; 252/171; 252/174.19; 252/542; 252/550; 252/549; 252/DIG. 8; 8/137
[58] Field of Search .......... 252/170, 162, 171, 174.19, 252/549, 550, DIG. 8, 542; 8/137

[56] References Cited

U.S. PATENT DOCUMENTS 4,780,235 10/1988 Jackson ................................ 252/170
5,112,358  5/1992 Deal, III ................................ 8/137
5,277,836 11/1994 Peters .................................. 252/143

*Primary Examiner*—Paul Lieberman
*Assistant Examiner*—Necholus Ogden
*Attorney, Agent, or Firm*—Donald R. Fraser

[57] ABSTRACT

A graphic ink remover composition consisting of (A) dibasic ester, (2) dipropylene glycol methyl ether acetate and (3) about 2 to 12 percent by weight of the composition of a surfactant that is cocamide DEA/dihexyl sodium sulfosuccinate.

7 Claims, No Drawings

GRAPHIC INK REMOVER COMPOSITION CONTAINING DIBASIC ESTER AND METHOD OF REMOVING INK

The present invention relates to graphic ink remover compositions for removing graphic ink from silk screens, the composition comprising a dibasic acid ester and dipropylene glycol methyl ether acetate.

BACKGROUND OF THE INVENTION

Graphic inks are used with silk screens for printing. The clean-up operation and removal of graphic ink is difficult, especially in removing all the ink without leaving a hazy surface or film on the screen even after a water rinse.

OBJECTS OF THE INVENTION

It is an object of the invention to provide a quick, clean, efficient graphic ink remover for removing substantially all of the graphic ink on a silk screen without leaving an appreciable film behind.

It is an object of the invention to provide a graphic ink remover composition consisting of (A) dibasic ester, (B) dipropylene glycol methyl ether acetate and (C) about 2 or 2½ up 10 or 12 percent by weight of the composition of a surfactant that is cocamide DEA/-Dihexyl Sodium Sulfosuccinate (CDDSS)—Monamulse DL-1273 TM.

These and other objects will be apparent from the specification that follows and the appended claim.

SUMMARY OF THE INVENTION

The present inventor provides a graphic ink remover composition consisting essentially of (A) a dibasic ester and (B) a sufficient amount of dipropylene glycol methyl ether acetate to make the total of (A) & (B) about 88 to 98 percent by weight of the composition, and (C) about 2 to 12 percent by weight of a (nonionic and anionic) surfactant that is CDDSS (Monamulse DL-1273).

Preferred and optimum compositions of the invention are as follows in approximate percent by weight:

| Ingredients | % Preferred | Optimum |
| --- | --- | --- |
| dibasic ester | 60–80 | 68–78 |
| dipropylene glycol methyl ether acetate | 18–38 | 21–29 |
| Surfactant: (anionic and nonionic) (Monamulse DL-1173 TM | 2–12 | 3–6 |

DETAILED DESCRIPTION OF THE INVENTION

EXAMPLE

The following preferred composition was tested and found to effectively remove graphic ink from a silk screen.

| Ingredient | % by weight |
| --- | --- |
| Dibasic ester | 72 |
| dipropylene glycol methyl ether acetate | 25 |
| Monamulse DL-1273 TM surfactant (Cocamide DEA/ Dihexyl Sodium Sulfosuccinate) | 3 |

The above composition was applied to a silk screen used with and covered with graphic ink. The ink was removed by cloth wiping. The composition and ink was thoroughly removed effectively by rinsing with water. Various inks including plastisol inks, epoxy inks and UV inks were effectively removed. The surfactant, MONAMULSE DL-1273, comprises a mixture of coconut oil diethanolamide and dihexyl sodium sulfosuccinate. These compounds are well-known in the industry as dispersing and emulsifying agents. The mixture is referred to in the industry as cocamide DEA/dihexyl sodium sulfosuccinate.

The cleaning composition of the Example provides superior and highly advantageous results. Dipropylene glycol methyl ether acetate helps provide superior results, glycol ether such as propylene or dipropylene glycol n-butyl ethers not being satisfactory. The CDDSS surfactant provides superior results, Neodol 1-15 TM (ethoxylated undecyl alcohol or Tween 20 TM not being satisfactory because either not all the ink is removed or a film is left behind even after a water rinse.

The Jackson (duPont) U.S. Pat. No. 4,780,235 discloses a paint remover composition comprising (A) a dibasic ester (B) an activator (C) a thickener, (D) surfactant, and (E) a non-halogen containing organic solvent such as NMP (N-methyl-2-pyrrolidone or esters of dipropylene and tripropylene glycol ether or their alkyl esters. There is no suggestion in the Jackson component solvent (E) that dipropylene glycol methyl ether acetate can be used to provide superior results. Likewise, there is no suggestion in the surfactant component (D) that cocamide DEA/dihexyl sodium sulfosuccinate be used or that superior results are obtained thereby.

In the graphic ink remover formulation the dibasic ester component (dialkl esters of diarboxylic aliphatic acids having 4 to 12 carbon atoms) have alkyl groups of 1 to 5 carbon atoms and the dibasic acid generally has 3 or 4 up to 10 or 12 carbon atoms. Suitable dibasic esters are dimethoxy adipate, dipropoxy adipate, diethoxy adipate, dibutoxy adipate as well as corresponding dialkyl esters of succinic acid and glutaric acid. Other suitable dialkyl esters have the acid portion derived from oxalic, malonic, primalic and azelaic acids. The dibasic esters are described in duPont U.S. Pat. Nos. 4,467,800, 5,096,501 and 5,002,078, incorporated herein by reference.

The cleaner composition has an outstanding balance of properties including easy removal of coatings from silk screen surfaces, being non-irritating, having a pleasant order, being quick drying, having miscible ingredients, and leaving the cleaned surfaces free of surface film.

What is claimed is:

1. A non-aqueous graphic ink remover composition consisting of (A) dibasic ester, (2) dipropylene glycol methyl ether acetate and (3) about 2½ to 10 percent by weight of the composition of a surfactant comprising cocamide DEA/dihexyl sodium sulfosuccinate.

2. A composition as defined in claim 1 having the following composition in approximate percent by weight:

| Ingredients | % by weight |
|---|---|
| Dibasic ester | 72 |
| dipropylene glycol methyl ether acetate | 25 |
| Surfactant | 3 |

3. A composition as defined in claim 1 in which the surfactant is present in an amount of at least about 2½ total weight percent.

4. A method of effectively removing graphic ink from a silk screen comprising the step of applying the composition of claim 1 to the graphic ink on the screen.

5. A method as defined in claim 4 including an additional step of rinsing the silk screen with water.

6. A cleaning composition consisting of (A) a dibasic ester and (B) a sufficient amount of dipropylene glycol methyl ether acetate to make the total of (A) and (B) about 88 to 98 percent by weight of the composition, and (C) about 2 to 12 percent by weight of a surfactant that is cocamide DEA/dihexyl sodium sulfosuccinate.

7. A composition as defined in claim 6 in which the amount of surfactant is about 2½ to 10 percent by weight.

* * * * *